July 28, 1936. G. A. HENDEY 2,048,792
WIPING TOOL
Filed March 7, 1935
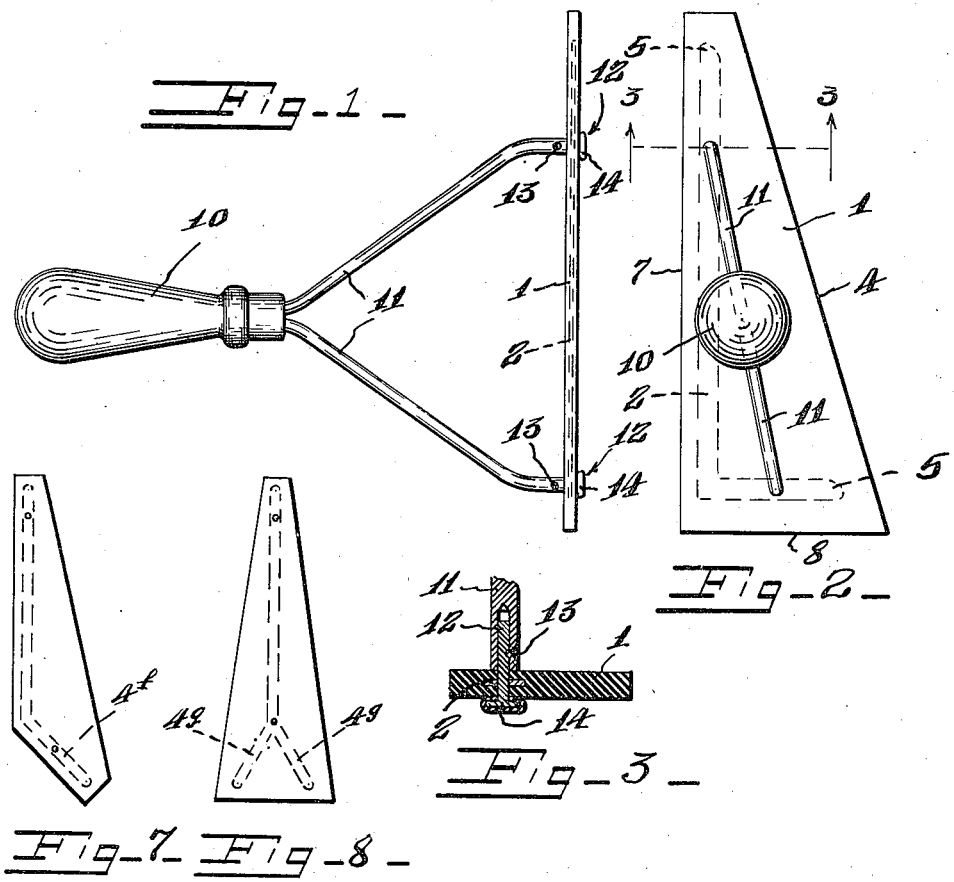
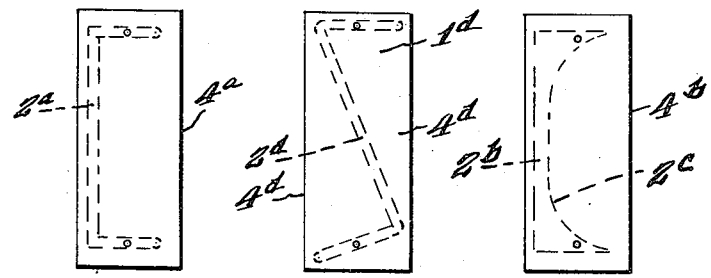
INVENTOR.
George A. Hendey.
BY
Boddell & Thompson
ATTORNEYS.

Patented July 28, 1936

2,048,792

UNITED STATES PATENT OFFICE 2,048,792

WIPING TOOL

George A. Hendey, Rome, N. Y.

Application March 7, 1935, Serial No. 9,821

4 Claims. (Cl. 15—245)

This invention relates to wiping tools and particularly to a tool for wiping flat and curved surfaces, and for wiping up into corners, and has for its object a tool so constructed as to have a wiping edge that will closely conform to surfaces having varying contours and degrees of curvature, as for instance, the surfaces of automobile bodies and fenders, which embody different convex curvatures as well as flat surfaces, and also flat surfaces with raised ribs or beads.

It further has for its object a wiping tool having one or more wiping edges of equal flexibility throughout for wiping flat surfaces, as windows, and a wiping edge of differential flexibility throughout its length to readily and closely conform to different curved surfaces and to flat surfaces.

It further has for its object a tool having a wiper head consisting of a flexible sheet or strip with a rigid backing so arranged as to provide straight edges of equal flexibility and an edge of differential flexibility throughout the length thereof.

It further has for its object a wiping tool with these characteristics which is particularly simple and economical in construction and highly efficient in use.

The invention consists in the novel features and in the combinations and constructions hereinafter set forth and claimed.

In describing this invention, reference is had to the accompanying drawing in which like characters designate corresponding parts in all the views.

Figure 1 is a plan view of this wiping tool.

Figure 2 is a plan view looking to the right in Figure 1.

Figure 3 is an enlarged sectional view on line 3—3, Figure 2.

Figures 4, 5, 6, 7 and 8 are views similar to Figure 2 on a reduced scale showing other forms the angular backing may have, the handle being omitted in these views.

This wiping tool comprises, generally, a wiper head including a sheet or strip of flexible material having a rigid backing to which the handle is secured, the backing being so arranged that it terminates near opposite ends of one of the wiping edges, but is spaced different distances throughout the length of the wiping edge and the backing, from said wiping edge in order to provide the wiping edge with different degrees of flexibility, in order that the wiping edge may closely conform to a flat surface and projections or ridges on the flat surface and also closely conform to surfaces having various degrees of convexities or curvatures.

1 designates the strip of flexible material, this being here shown as right angle triangular in general form, the altitude of the right triangular formation being considerably greater than the base. 2 designates the backing, this being also right angular in general form with the legs of the angular formation extending parallel to the legs of the right angle triangular formation of the strip 1 and spaced therefrom, but with the wiping edge 4 on the hypotenuse side of the triangular formation of the strip, spaced different distances from the legs of the backing 2, with the ends of the legs at 5 located substantially equal distances from the edge 4 near the ends of the edge. Thus, the intermediate part of the edge 4 is spaced different distances from the backing 2 resulting in different degrees of flexibility throughout the length of the edge 4. This results in flexibility which causes said edge 4, when being wiped over a surface, to readily and closely conform to different curvatures with equal pressure throughout its length.

The other edges 7 and 8 along the legs of the right angle triangular formation of the strip 1, because of their parallelism to the legs of the backing 2 are of equal flexibility throughout and are particularly adapted for wiping flat surfaces and glass, the shorter edge 8 being capable of working into places where the tool is otherwise too wide. The corners formed by the edges also dig into angles between two surfaces at an angle to each other. The apex portion of the triangular formation is here shown as truncated and may be trimmed off by the purchaser to any desired shape.

The sheet 1 is preferably of rubber and the backing 2 is embedded in the rubber and is either molded therein or may be embedded therein in any other manner, as for instance, by being placed between two sheets of rubber, vulcanized or otherwise integrally secured together to form the strip 1.

The handle 10 of the tool is secured to the backing at spaced apart points, and as here shown, includes a rigid bifurcated shank 11 rigidly secured to the backing in any suitable manner.

As illustrated in Figure 3, the bifurcations are secured to the backing 2 by fastening members 12 extending through the strip 1 and holes in the backing 2 and axially into the ends of the bifurcations 11 and secured therein in any suitable manner, as by indenting at 13. The members 12 are provided with heads 14 at their outer ends which are covered with a cushioning material as rubber.

Instead of being triangular in form, the wiper heads may be of other shapes, as shown in Figures 4 and 5, in which they are shown as rectangular. In Figure 4, the backing 2ª is shown as oblong in form with one side of the oblong removed, and with the open side thereof toward the wiping edge 4ª providing the different degrees of flexibility throughout the length thereof.

In Figure 5, the backing 2ᵇ is shown as formed with a concave edge 2ᶜ toward the wiping edge 4ᵇ providing the different degrees of flexibility throughout the length thereof.

In Figure 6, a tool is shown with a backing 2ᵈ having two angular legs, one extending at a right angle and the other at an inclined angle to the major part of the backing, which extends in a diagonal direction relative to a rectangular wiper 1ᵈ. In this form of the invention, two edges 4ᵈ are provided which have various degrees of flexibility throughout their length.

In Figure 7, a tool is shown similar to that shown in Figure 2 but with the leg 4ᶠ of the backing extending at an obtuse angle to the major part of the backing.

In Figure 8, the backing is shown as formed with two angular legs 4ᵍ at the same end thereof extending at an obtuse angle to the major part of the backing, providing a double wiping edge with different degrees of flexibility throughout the lengths thereof.

In any form of the invention, because of the arrangement of the backing to the flexible wiping strip, one edge of the strip is provided with different degrees of flexibility throughout the length thereof to readily and closely conform with equal pressure throughout its length, to surfaces of varying contours, and also with one or more straight edges of equal flexibility throughout its length.

This tool is particularly adapted for wiping off the bodies, fenders, hood and windows of automobiles, and owing to the flexible conformable edge 4, to fit any curve or any changes in the curves as they come, while the tool is being wiped over the curved surface, it will also flatten out and conform to a straight edge or vice-versa.

What I claim is:

1. A wiping tool comprising a wiper head including a strip of flexible material in the general form of a right angle triangle and a rigid backing for the strip right angular in form and having the legs of its angular formation extending parallel to edges of the strip, the hypotenuse side of the right triangular formation of the strip extending at an angle to each leg of the backing.

2. A wiping tool comprising a wiper head including a strip of flexible material in the general form of a right angle triangle and a rigid backing for the strip right angular in form and having the legs of its angular formation extending parallel to edges of the strip, the hypotenuse side of the right triangular formation of the strip extending at an angle to each leg of the backing, and a handle having a bifurcated shank secured to the legs of the angular formation of the backing.

3. A wiping tool comprising a strip of flexible material, a rigid backing therefor angular in general form and having legs extending at an angle to each other, the strip having a plurality of wiping edges extending along the backing substantially parallel to the adjacent leg of the angular formation, and an edge spaced different distances throughout its length from the backing and extending in a general direction of the hypotenuse of a triangle of which said legs form two of the sides, thereby providing different degrees of flexibility of the portion provided with the last-mentioned edge, whereby the last-mentioned edge can closely conform to different curvatures of the surface being wiped.

4. A wiping tool comprising a strip of flexible material, a rigid backing therefor angular in general form, the strip having a plurality of wiping edges extending along the backing substantially parallel to the adjacent leg of the angular formation, and an edge spaced different distances throughout its length from the backing providing different degrees of flexibility of the portion provided with the last-mentioned edge, whereby the last-mentioned edge can closely conform to different curvatures of the surface being wiped, the end portions of the backing terminating adjacent the last edge.

GEORGE A. HENDEY.